United States Patent
Brault et al.

(10) Patent No.: US 11,371,384 B2
(45) Date of Patent: Jun. 28, 2022

(54) TURBOMACHINE COMPRISING A MEANS FOR DECOUPLING A FAN

(71) Applicant: SAFRAN AIRCRAFT ENGINES, Paris (FR)

(72) Inventors: Michel Gilbert Roland Brault, Moissy-Cramayel (FR); Julien Fabien Patrick Becoulet, Moissy-Cramayel (FR); Arnaud Nicolas Negri, Moissy-Cramayel (FR); Didier Jean-Louis Yvon, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 74 days.

(21) Appl. No.: 16/471,489

(22) PCT Filed: Dec. 21, 2017

(86) PCT No.: PCT/FR2017/053765
§ 371 (c)(1),
(2) Date: Jun. 19, 2019

(87) PCT Pub. No.: WO2018/115763
PCT Pub. Date: Jun. 28, 2018

(65) Prior Publication Data
US 2020/0018181 A1    Jan. 16, 2020

(30) Foreign Application Priority Data
Dec. 23, 2016 (FR) ...................................... 1663359

(51) Int. Cl.
*F01D 21/04* (2006.01)
*F01D 5/02* (2006.01)
*F02K 3/06* (2006.01)

(52) U.S. Cl.
CPC ...... *F01D 21/045* (2013.01); *F05D 2260/311* (2013.01); *F05D 2260/4031* (2013.01)

(58) Field of Classification Search
CPC .... F01D 21/045; F01D 25/162; F01D 25/164; F01D 21/04; F01D 21/02; F01D 21/08;
(Continued)

(56) References Cited

U.S. PATENT DOCUMENTS

| 4,827,712 A | 5/1989 | Coplin |
| 7,201,529 B2 * | 4/2007 | Lejeune ................ F01D 21/045 403/2 |

(Continued)

FOREIGN PATENT DOCUMENTS

| EP | 1439316 B1 | 6/2006 |
| EP | 2048330 A2 | 4/2009 |

(Continued)

OTHER PUBLICATIONS

International Search Report received for PCT Patent Application No. PCT/FR2017/053765, dated Apr. 6, 2018, 7 pages (3 pages of English Translation and 4 pages of Original Document).

*Primary Examiner* — Eric J Zamora Alvarez
(74) *Attorney, Agent, or Firm* — Womble Bond Dickinson (US) LLP (57) ABSTRACT

A turbine engine including a fan shaft driven by a turbine shaft with a rotational speed reduction device. A decoupling element is interposed between the reduction device and the fan shaft which operates to decouple the reduction device and the fan shaft. The reduction device is coupled to the fan shaft by a coupling having trapezoidal teeth of the curvic type which are used during the said decoupling operation. The decoupling element is configured to decouple the reduction device and the fan shaft in response to a predetermined
(Continued)

resistive torque, referred to as the decoupling torque, which acts between the fan shaft and the reduction device.

10 Claims, 5 Drawing Sheets

(58) Field of Classification Search
CPC .......... F01D 5/025; F01D 5/026; F01D 5/066; F01D 5/3007; F02C 7/36; F05D 2260/3011; F05D 2260/301; F05D 2260/40311; F05D 2260/36; F05D 2270/091; F05D 2260/311; F05D 2260/4031; F16B 31/021; Y10T 403/11
See application file for complete search history.

(56) References Cited

U.S. PATENT DOCUMENTS

| | | | |
|---|---|---|---|
| 2013/0324343 A1 | 12/2013 | Gallet | |
| 2015/0377027 A1* | 12/2015 | Maguire | ............... F01D 25/164 416/219 R |
| 2016/0146112 A1* | 5/2016 | Van der Merwe | ........ F02C 7/32 475/331 |

FOREIGN PATENT DOCUMENTS

| | | |
|---|---|---|
| FR | 2541724 A1 | 8/1984 |
| FR | 2987402 A1 | 8/2013 |
| FR | 2987417 A1 | 8/2013 |
| GB | 2130340 A | 5/1984 |

* cited by examiner

TURBOMACHINE COMPRISING A MEANS FOR DECOUPLING A FAN

The field of this invention is that of aeronautical turbine engine and, more particularly that of bypass turbine engines comprising a reduction device for driving the fan.

Conventionally, turbine engine comprise, starting from upstream, one or several compressor modules arranged in series, which compress the air sucked into an air inlet. The air is then introduced into a combustion chamber where it is mixed with a fuel and burnt. The combustion gases pass through one or several turbine modules that drive the compressor or compressors by means of associated turbine shafts. The gases are finally ejected either into a nozzle in order to produce a propulsion force or on a free turbine in order to produce power which is recovered on a drive shaft.

Current bypass turbine engines with a high rate of dilution comprise several compressor stages, in particular a low pressure (LP) compressor and a high pressure (HP) compressor, through which a primary flow passes. These low pressure (LP) and high pressure (HP) compressors are each driven by an associated respective low pressure turbine (LP) or high pressure (HP) shaft. Upstream from the low pressure (LP) compressor is arranged a wheel comprising mobile blades or large vanes, or fan, which feeds both the primary flow that passes through the LP and HP compressors and a cold flow, or secondary flow, which is directed directly towards a cold flow nozzle, referred to as a secondary nozzle. The fan is driven by the LP turbine rotation shaft of the LP body and generally rotates at the same speed as it does.

It can be useful to rotate the fan at a rotation speed slower than that of the LP shaft, in particular when the latter is very large, for the purpose of adapting it better aerodynamically. For this, a reduction device is placed between the LP turbine shaft and a fan shaft, which carries the fan. Such a configuration is in particular described in patent applications FR-1.251.655 and FR-1.251.656 filed on 23 Feb. 2012.

In this configuration, it can occur that the fan loses a blade, for example in case of the ingestion of a foreign body such as a bird. This phenomenon, also known as "Fan Blade Out" (FBO) causes an out-of-round of the fan with the consequence of causing a contact of the ends of its blades with the casing of the fan. This contact can abruptly slow down the fan although the reduction device and the turbine shaft are still driven by the LP turbine, which can create a high torque in the LP turbine shaft and in the reduction device.

The torsion of the shafts can lead to fractures of the shafts at different points of the turbine engine, as disclosed document EP-2.048.330-A2.

Document EP-2.048.330-A2 discloses a turbine engine comprising a fan shaft and a shaft of a compressor each driven by a turbine shaft by means of two different torque paths coupled to the turbine shaft on an intersection arranged on a bearing. The torque path drives the fan by means of a reduction device. The two torque paths are provided so that, in case of incidental fracture of one of the torque paths, the turbine remains loaded on the other torque path so as to prevent overspeed of the turbine, while a control unit of the turbine can reduce the speed of the turbine. The turbine engine described in this document is based on the observation that a possible mechanical malfunction of the torque paths can occur, such as for example the one that connects the turbine shaft to the fan. However, this document does not explicitly specify the nature of this malfunction, which may or may not consist of a fracture, but which is in any case incidental and unforeseeable. In the case of a fracture of the torque path of the turbine shaft to the fan, this incidental fracture takes place while the reduction device has already been subjected to substantial torques and has most likely already been damaged.

Document EP-1.439.316-B1 describes and shows a turbine engine comprising a fan coupled to a shaft line by means of a reduction device. A decoupling device, which is interposed between a shaft of the fan and the reduction device, allows the decoupling of the fan shaft in case of the loss of a blade of the latter. The triggering of the decoupling of the decoupling device is based on an axial displacement of the fan shaft due to the detection of an imbalance caused by the loss of a blade of the fan. The device comprises a first flange secured to a bearing support of the fan shaft and a second flange secured to the casing, arranged facing the first flange, surrounding this shaft, and which is coupled to the first flange by a first set of fusible screws. The imbalance causes the fracture of the first set of fusible axial screws, which causes the axial uncoupling and the advancing of the fan shaft. The device further comprises, downstream from these flanges, two plates with a straight tooth coupling. A first plate is connected to the fan shaft and a second plate is connected to an input shaft of the reduction device. These plates are coupled by a second set of fusible screws. When the first set of fusible axial screws is broken, the fan shaft advances and drives the first plate in such a way that the heads of the second set of fusible axial screws strike the second flange secured to the casing and break by shearing, which causes the fracture of the coupling.

This design has the disadvantage of subjecting the fracture of the coupling between the fan shaft and the reduction device only to the presence of an imbalance that is exerted on the fan, and not taking into account the resistive torsion torque which acts between the fan and the reduction device. In particular, this device cannot allow for the decoupling of the fan in case of jamming of the reduction device.

Furthermore, this device has the disadvantage of triggering the fracture of the coupling when an imbalance is present in the fan, and can therefore trigger the fracture of the coupling even when the fan, although operating with an imbalance, does not oppose a torque that is able to disrupt the operation of the reduction device and of the turbine engine. Furthermore, this device is particularly voluminous axially since it requires for its operation an axial decoupler on the bearings of the fan shaft arranged in line axially, and clearances that correspond to the movements of these parts.

It is desirable to limit the resistive torque which acts between the fan shaft and the reduction device, regardless of the origin thereof, whether this torque results from the loss of a blade, or on the contrary, a blocking of the reduction device.

On one hand, indeed, the existence of a high resistive torsion torque at the input of the reduction device in case of the loss of a blade risks seriously damaging said reduction device, which could then become blocked and make the rotation of the fan impossible. Conversely, an incidental blocking of the reduction device could block the fan and render the rotation thereof impossible.

In both cases, this would have the consequence of abruptly increasing the aerodynamic drag of the engine, making the aircraft impossible to fly.

In order to overcome this disadvantage, a solution consists in limiting the torsion torque that can be exerted between the fan shaft and the reduction device, so as to avoid the blocking of the fan.

Moreover, limiting this torque allowed to prevent any oversizing of the members of the reduction device and of the low pressure turbine shaft, and consequently to lighten the design of the reduction device and of the LP turbine shaft.

For this purpose, the invention proposes a turbine engine of the type described above, characterised in that the reduction device is coupled to the fan shaft by means of a coupling having trapezoidal teeth of the curvic type, which comprises said decoupling means, said decoupling means being configured to decouple the reduction device and the fan shaft in response to a predetermined resistive torque referred to as the decoupling torque acting between the fan shaft and the reduction device.

Advantageously, the decoupling is therefore an event planned in response to a predetermined resistive torque acting between the reduction device and the fan shaft, i.e. conditioned by the exceeding of this resistive torque. In addition, the decoupling is carried out regardless of the origin of this resistive torque.

According to other characteristics of the turbine engine:
- the teeth of the coupling having trapezoidal teeth of the curvic type extend axially and it comprises two toothed coupling plates meshing with one another and fastened to one another by means of fusible axial screws forming the decoupling means.
- the plates each comprise two coaxial sets of trapezoidal teeth, and the fusible axial screws pass through bore holes formed in the plates and arranged substantially along an intermediate radius between the two coaxial sets of teeth,
- the fusible axial screws each comprise a section of reduced diameter, forming a fracture initiation and arranged between two main sections with a diameter greater than said section of reduced diameter,
- the tilt angles of inclined planes of the trapezoidal teeth, the number of fusible screws, the diameters of the fracture and main sections of the fusible screws, and a tightening torque of said fusible screws are configured to allow for the fracture of said fusible screws when a torque exerted between the plates of the coupling exceeds the decoupling torque,
- the reduction device is a reduction gear of the epicyclic type, a planetary gear is rotationally driven by a turbine shaft of the turbine engine, at least one planetary carrier of said reduction device rotationally drives one of the plates with trapezoidal teeth of the coupling, and at least one crown of said reduction device, which is secured to a casing of the turbine engine by means of an axially deformable support, allows an axial retraction of said reduction device according to which said crown, when the plates of the coupling are separated following the fracture of the fusible screws, accompanies the retraction of said planetary carrier on said planetary gear,
- the planetary carrier of said reduction device comprises bore holes that are arranged facing bore holes of said plate, said bore holes passing through said planetary carrier and being configured to receive the thread ends of the fusible screws, the lock nuts of the fusible screws, and to allow for the passage of a tool for tightening said nuts through said bore holes,
- the turbine engine comprises means for retaining the fusible screws,
- the fusible screws are able to be fractured when the coupling of the curvic type is subjected to a resistive torque greater than or equal to a decoupling torque corresponding to a resistive torque exerted by the fan on the speed reduction device in case of loss of at least one blade of the fan driven by said fan shaft,
- the fusible screws are able to be fractured when the coupling of the curvic type is subjected to a resistive torque greater than or equal to a decoupling torque that corresponds to a resistive torque exerted by the speed reduction device on the fan shaft and which corresponds to a case of jamming of said reduction device, The invention will be better understood, and other purposes, characteristics and advantages thereof shall appear more clearly in the following detailed explanatory description of an embodiment of the invention given by way of purely informative example and not limited thereto, with reference to the accompanying diagrammatical drawings in which:

In the following description, identical reference figures designate parts that are identical or that have similar functions.

Figure 1:
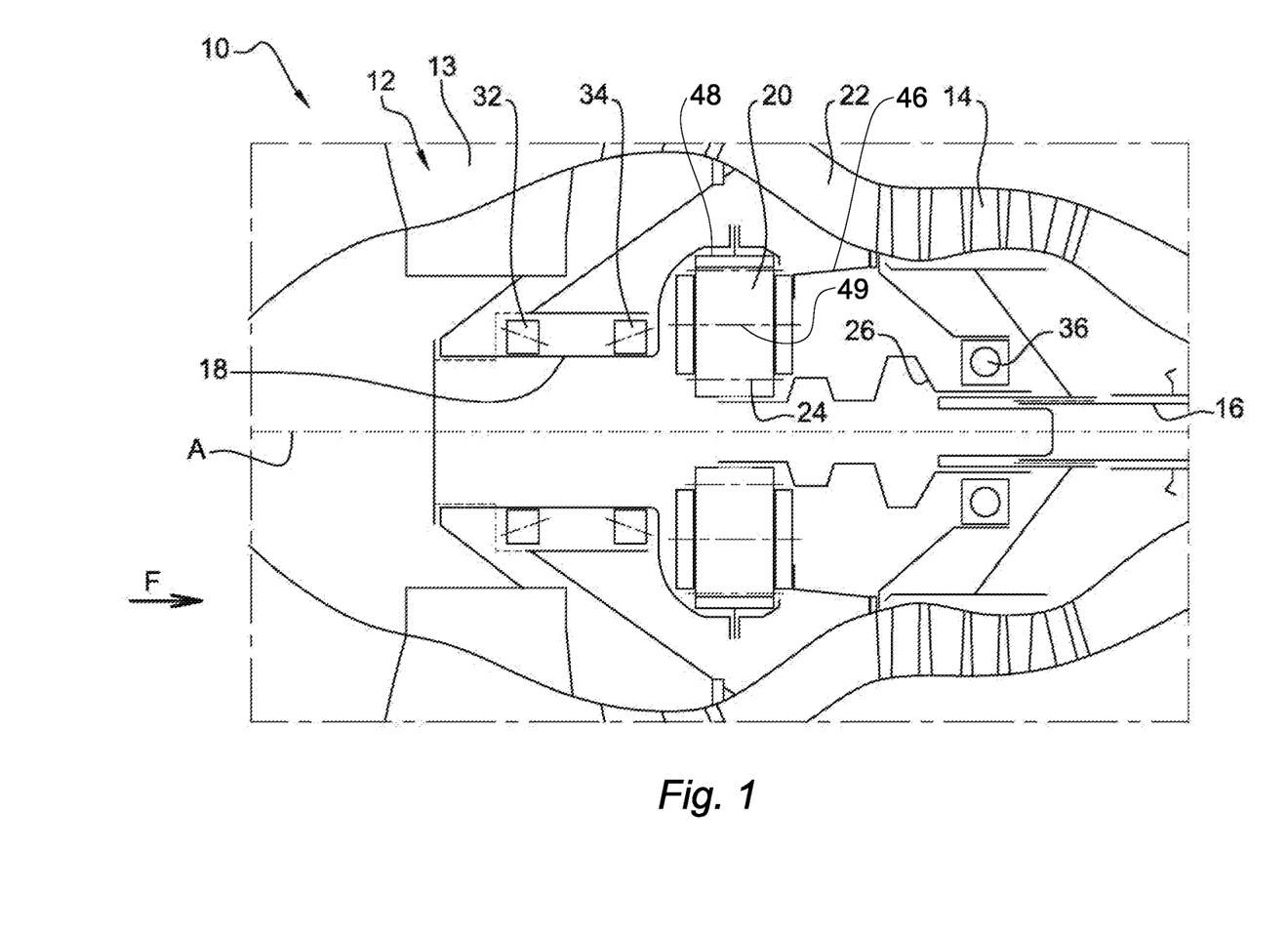
FIG. 1 is a general view of a turbine engine according to the technique of the prior art technique.

FIG. 1 shows a turbine engine such as a turbine engine 10 according to prior art. In a known manner, the turbine engine 10 comprises, from upstream to downstream according to the direction "F" of the flow of gases, a fan 12, a low pressure compressor 14, a high pressure compressor, a combustion chamber, a high pressure turbine and a low pressure turbine (not shown). The fan 12 comprises blades 13. The high pressure compressor and the high pressure turbine are connected by a high pressure shaft and form with it a high pressure body. The low pressure compressor 14 and the low pressure turbine are connected by a low pressure shaft 16 and form with it a low pressure body. The fan 12 is, for its part, carried by a fan shaft 18 which, in the example shown, is rotationally connected to the LP shaft 16, by means of a reduction device 20 of the rotation speed between the two shafts 16, 18.

Indeed, it is interesting to rotate the fan 12 at a rotation speed less than that of the LP shaft 16, in particular when the latter is very large, for the purpose of adapting it better aerodynamically.

The HP and LP shafts 16 extend along an axis of rotation "A" of the turbine engine 10.

The turbine engine 10 also comprises, conventionally, a fan casing (not shown) that allows to channel the gases sucked by the fan 12 to a primary flow duct 22, which passes through the LP and HP bodies, and a secondary flow stream (not shown) that surrounds a casing of the LP and HP bodies and joins the primary flow stream in a nozzle (not shown) of the turbine engine.

As shown in FIG. 1, the reduction device 20 is positioned between the fan shaft 18 and the LP shaft 16. This reduction device, for example of the epicyclic type, is shown in the schematic form of rectangles that only show its size. It is, in a non-limiting manner of the invention, driven by a planetary wheel 24 (represented by the trace of its teeth) carried by an input shaft 26 which is rotationally connected to the LP shaft 16, the shaft 16 being, by way of example only, received without clearance by press fitting into the shaft 26. It also comprises, a planetary carrier 49 (represented by the shaft of its satellites) integral with a casing 46 of the turbine engine, and a crown 48 that drives the shaft 18 of the fan 12.

In this configuration, it can occur that a resistive torque is exerted between the shaft 18 of the fan 12 and the reduction device 20. This type of situation can occur when the fan 12 loses a blade 13, for example in case of ingestion of a foreign body such as a bird or following a fatigue fracture resulting from unsuitable maintenance. This phenomenon, also known as Fan Blade Out (FBO) causes an out-of-round of the fan 12 with respect to the axis "A", which has the consequence of causing a contact of the ends of its blades 13 with the casing (not shown) of the fan 12. This contact can abruptly slow down the fan 12 even though the reduction device 20 and the LP turbine shaft 16 are still being driven by the LP turbine, which can create a high torsion torque in the LP turbine shaft 16 and in the reduction device 20.

Such a torsion torque in the case of a loss of a blade 13 risks seriously damaging the reduction device 20, which could then become blocked and render the rotation of the fan 12 impossible.

This type of situation can also occur in the case of jamming or blocking of the reduction device, of which the output can be involuntarily blocked or slowed down even though the fan is still under the effect of its inertia. This can result in a fracture of the fan shaft 18, which in turn results in an out-of-round of the fan, and in a blocking thereof.

In both cases, a blocking of the fan 12 would have the consequence of abruptly increasing the aerodynamic drag of the engine, making the aircraft impossible to fly.

In order to overcome this disadvantage, decoupling devices arranged between the fan shaft 18 and the reduction device 20 have already been proposed in the prior art. However, the latter are provided exclusively to be triggered in the case of the loss of a blade, in particular due to the appearance of an imbalance caused by the loss of this blade, not because of blocking or jamming of the reduction device. Therefore, they provide only limited protection to the kinematic chain.

In order to overcome this disadvantage, a solution consists in limiting the torsion torque that can be exerted between the fan shaft 18 and the reduction device 20, regardless of the origin of its appearance.

The limitation of the torsion torque has another advantage, which is to allow to prevent an oversizing of the members of the reduction device 20 or of the fan shaft 18 in order to ensure their resistance to such a torsion torque when exceeding a predetermined resistive toque. A decoupling device which acts between the speed reduction device 20 and the fan shaft 18 makes allows to prevent any oversizing of the internal members of the reduction device 20 and of the fan shaft 18, and consequently to reduce the mass and the inertia of the reduction device 20 and of the fan shaft 18.

Figure 2:
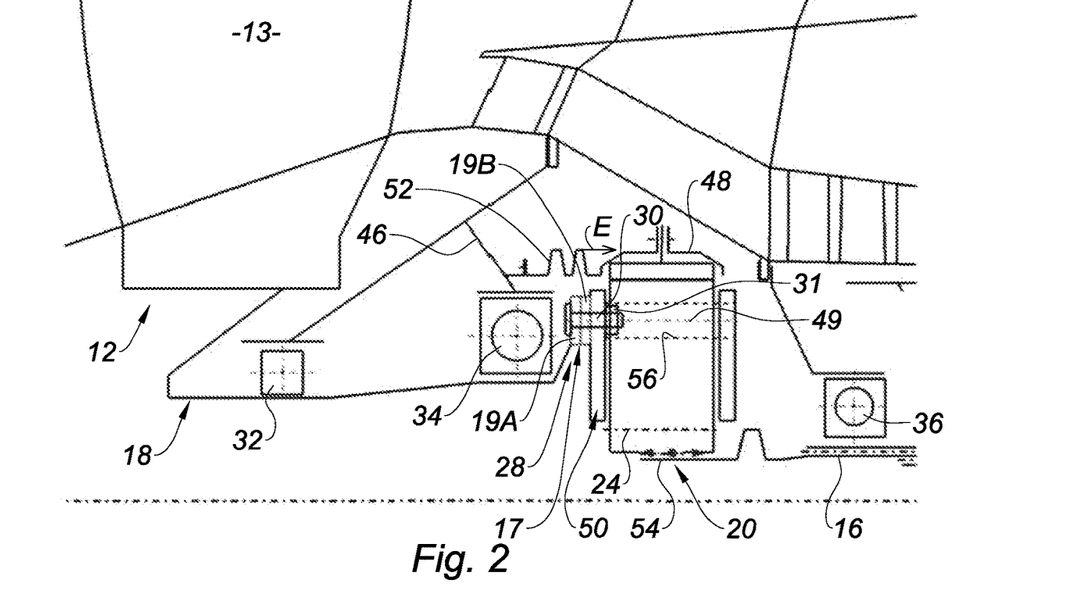
FIG. 2 is a schematic cross-section view of the front portion of a turbine engine according to the invention.

For this purpose, as shown in FIG. 2, the invention proposes a turbine engine 10 of the type described above comprising decoupling means 28 between the reduction device 20 and the fan shaft 18 and in which the reduction device 20 is coupled to the fan shaft 18 by means of a coupling 17 having trapezoidal teeth of the curvic type which comprises these decoupling means 28. The decoupling means 28 are configured to decouple the reduction device 20 and the fan shaft 18 in response to a predetermined resistive torque $C_D$ referred to as the decoupling torque which acts between the fan shaft 18 and the reduction device 20.

Figure 3:
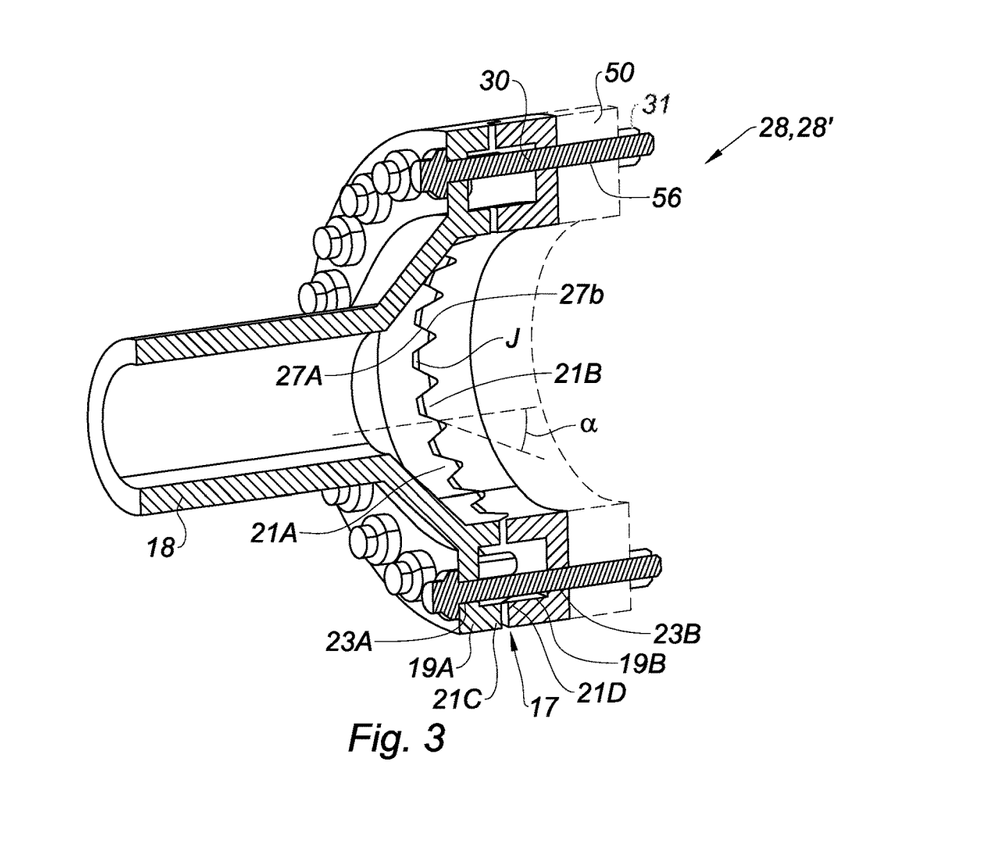
FIG. 3 is a perspective view of a coupling of the curvic type implemented in the invention.

More particularly, as shown in FIG. 2, the coupling 17 having trapezoidal teeth of the curvic type is interposed between an output flange 50 of the reduction device 20 and the fan shaft 18. As shown in FIG. 3, it comprises two toothed coupling plates 19A, 19B, namely the plate 19A integral with the fan shaft 18 and the plate 19B connected in rotation to the output flange 50 of the reduction device 20. The plates 19A, 19B respectively each comprise two coaxial sets of trapezoidal teeth. The plate 19A comprises a set of interior teeth 21A and a set of exterior teeth 21C, and the plate 19B comprises a set of interior teeth 21B and a set of exterior teeth 21D. The interior teeth 21A and 21B mesh with one another and the exterior teeth 21C, 21D mesh with one another. The direction of the height of the corresponding trapezes of the teeth 21A, 21B, 21C, 21D extends parallel to the axial direction.

The teeth 21A, 21B, 21C, 21D have inclined planes arranged in contact with one another. FIG. 3 shows the planes 27A, 27B of the teeth 21A, 21B, inclined along an angle α. The plates 19A, 19B are connected to one another by means of axial fusible 30 axial screws 30 that pass through bore holes 23A, 23B arranged substantially along an intermediate radius R of the plates 19A, 19B between the teeth 21A, 21B on the one hand and 21C, 21D on the other hand. Advantageously, the fusible axial screws 30 also pass through the output flange 50 and allow the connection thereof in rotation to the plate 19B by means of nuts 31 that tighten the output flange 50 against the plate 19B. The angle α chosen is preferably between 20° and 70° with respect to the motor shaft, even more preferably between 20° and 40°.

Figure 4:
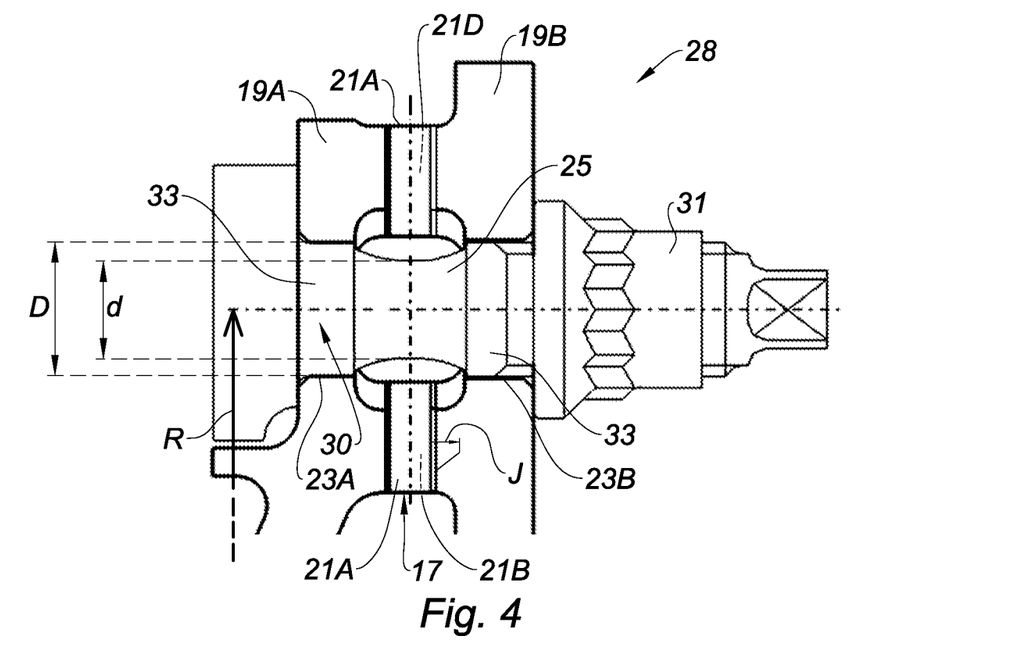
FIG. 4 is a detailed view of the coupling of the curvic type implemented in the invention prior to the decoupling thereof.

As shown in FIGS. 3 and 4, a functional clearance J is arranged between the ends of the teeth 21A and the bottoms of the teeth 21B in order to guarantee good contact between the inclined planes 27A, 27B.

Alternatively, each one of the plates 19A, 19B could comprise, instead of two sets of coaxial teeth, only one set of teeth passed through by the fusible screws similar to the screws 31.

It should noted that, as an alternative, the plate 19B and the flange 50 can be the same and form a single part.

Figure 5:
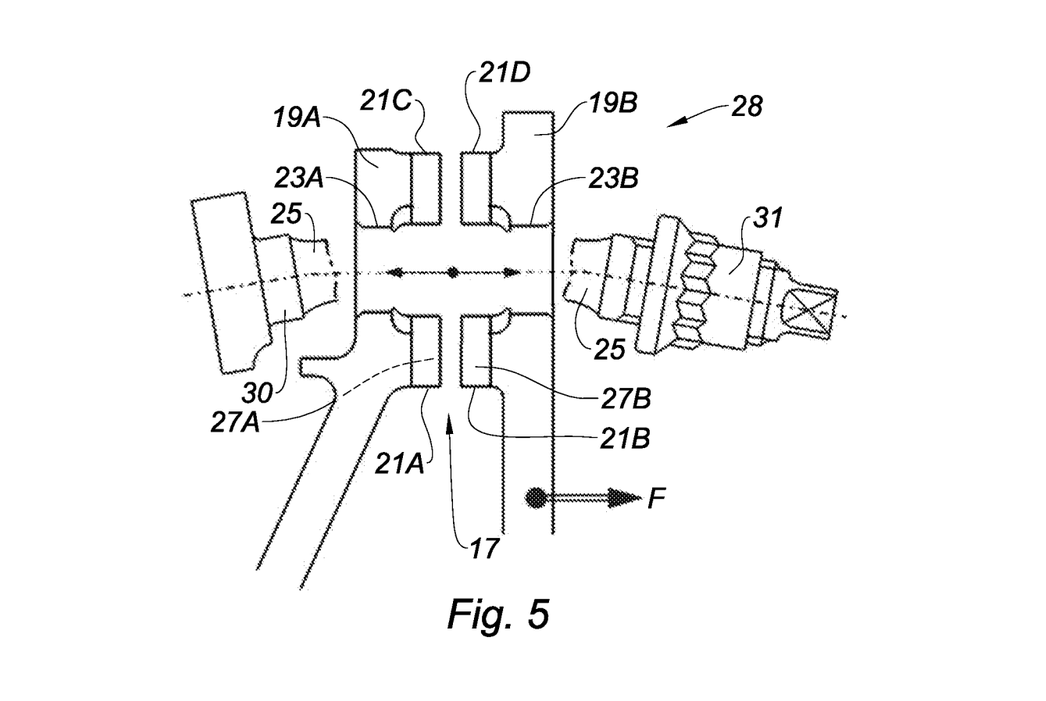
FIG. 5 is a detailed view of the coupling of the curvic type implemented in the invention prior to the decoupling thereof during decoupling.

More particularly, as shown in FIG. 4, the fusible axial screws 30 each comprise a section 25 of reduced diameter "d" forming tensile fracture initiation arranged between two sections 33 with a main diameter "D". As shown in FIG. 3, when such a coupling is subjected to a torsion torque between its two plates 19A, 19B, the trapezoidal teeth 21A, 21B, 21C, 21D transform, via their inclined planes 27A, 27B, the forces resulting from the torsion torque into a resulting axial force F between the plates 19A, 19B and which is exerted in the form of a traction force on the screws 30, as is shown in FIG. 5. This traction force has the consequence of causing a fracture of the screws 30 when they are subjected to a traction stress on their sections 25 of reduced diameter.

It will be understood that the tilt angles α of inclined planes 27A, 27B of the trapezoidal teeth 21A, 21B, tilt angles α of inclined planes of the trapezoidal teeth 21C, 21D, the number of fusible screws, the diameter "d" of the fracture sections 25 and the diameter "D" of the sections 33 with a main diameter "D" of the fusible screws, as well as a tightening torque of said fusible screws 30 by the nuts 31 are calculated beforehand during the design of the decoupling device in such a way that their configuration allows the fracture of these fusible screws when a torque exerted between the plates of the coupling 19A, 19B exceeds the decoupling torque $C_D$.

Figure 9:
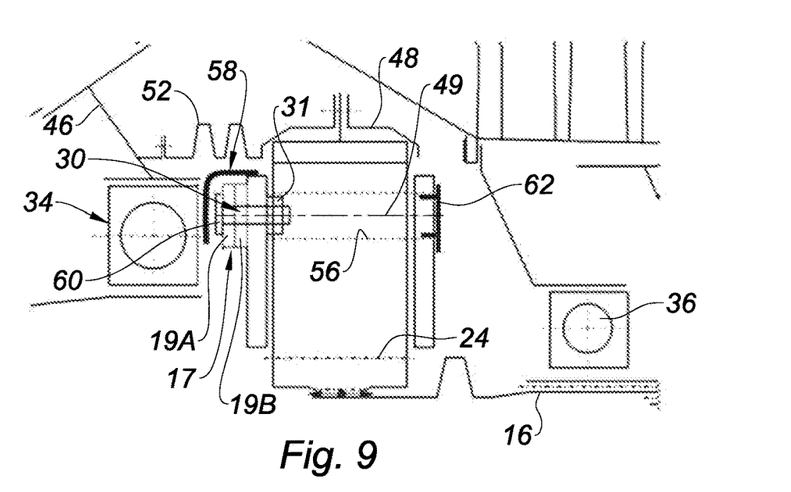
FIG. 9 is a cross-section view of an alternative reduction device implemented in the invention.

As shown in FIG. 2, the reduction device 20 is connected to a casing 46 of the turbine engine by at least one of its members. For example, in a non-limiting manner of the invention, as shown in FIG. 9, a crown 48 of the reduction device 20 is linked to the casing 46 by means of a support 52 that can be deformed axially, while a planetary carrier 49 of the reduction device 20 is coupled to the fan shaft 18 and a planetary gear 24 is coupled to the turbine shaft 16.

It will be understood that this arrangement does not limit the invention and that the elements of the reduction device 20 could be connected in a different way to the casing 46, to the fan shaft 18, and to the turbine shaft 16. This configuration allows to guarantee that once the reduction device 20 has been decoupled from the turbine shaft 16 and from the fan shaft 18, it however remains maintained in the casing 46 of the turbine engine.

In particular, the crown 48 of the reduction device 20 could be connected to the fan shaft 18, the planetary carrier 49 of the reduction device 20 could be connected to the casing 44 of the turbine engine, while the planetary gear 24 would be coupled to the turbine shaft 16, similarly to the configuration of FIG. 1.

In addition, in the case of a reduction device 20 of the planetary or epicyclic type, the input shaft 26 is mounted in this reduction device 20, i.e. here in the planetary gear 24, by means of splines 54. The sliding of the inclined planes 27A, 27B of the sets of teeth separates the plates 19A, 19B, and because of this, requires an axial clearance of the speed reduction device 20.

Figure 6:
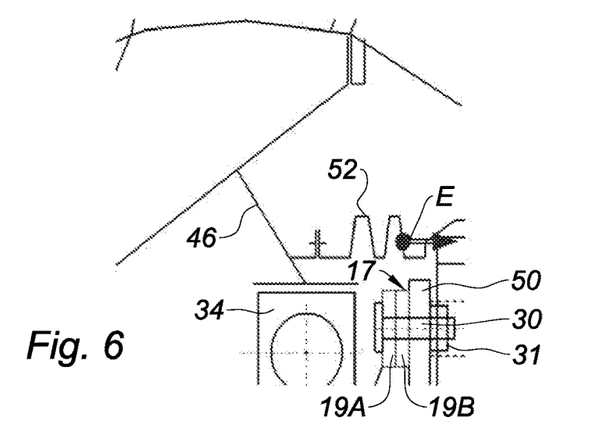
FIG. 6 is a detailed view of a support of a reduction device implemented in the invention.

Advantageously, the reduction device 20 can, by means of the set of splines 54, be interposed between the input shaft of the reduction device 20 and the planetary gear 24, and of the support 52 of the crown 48 which is deformed in order to accompany the crown 48 of the reduction device 20, to axially retract, as shown by the arrow "E" of FIGS. 2 and 6. This movement, initiated when the coupling 17 is subjected to a torque, continues after the fracture of the screws 30 so as to allow for a more substantial axial retraction of the reduction device 20, and doing this, the separation of the flange 50 and of the fan shaft 18.

This configuration is particularly advantageous because, by allowing the reduction device to retract, it allows to prevent any stress on the shaft 18 of the fan 12. Because of this, there is no need to provide any decoupling bearing for this shaft 18, which can remain rotating on ordinary bearings.

Once decoupled, the fan 12 is subjected to a free rotation speed or "windmilling" which allows the turbine engine to produce only a reduced trail, thereby making it possible to retain a certain manoeuvrability for the aircraft equipped with the turbine engine.

Figure 7:
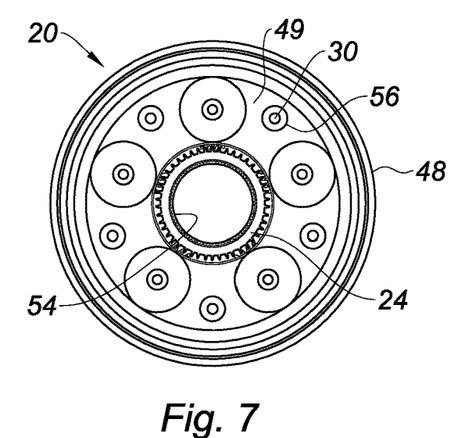
FIG. 7 is a view of the end of a reduction device implemented in the invention.
Figure 8:
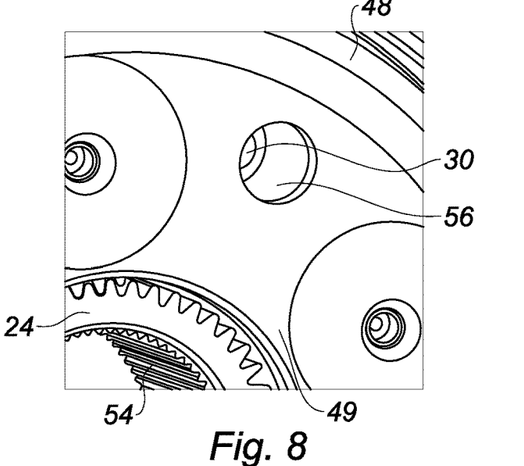
FIG. 8 is a perspective detailed view of a reduction device implemented in the invention.

In the particular case of a speed reduction device 20 of the planetary or epicyclic type in which the planetary carrier 49 drives one of the plates 19B with trapezoidal teeth of the coupling 17, it is possible to provide a compact arrangement of the screws 30. To this effect, as shown in FIGS. 7 and 8, the planetary carrier comprises bore holes 56 that are arranged facing the bore holes 23B of the plate 19B. These bore holes 56 pass through the planetary carrier 49 and they are configured to receive the thread ends of the fusible screws 30 and the lock nuts 31 of the fusible screws, and especially to allow the passage of a tool for tightening the nuts 31 through bore holes 56. Thus an operator in charge of mounting the turbine engine can very simply tighten the nuts 31 by inserting a socket wrench into the bore holes 56 on the side of the reduction device 20 opposite the flange 50.

According to an alternative of the invention, the turbine engine comprises means for retaining the fusible screws 30. Preferably, as shown in FIG. 7, these means comprise a flange 58 integral with the plate 19A of the curvic coupling, which is intended to immobilise the heads 60 of the screws 30 after the fracture thereof. On the opposite side the bore holes 56 of the planetary carrier 49 receive shutters 62 intended to prevent the body of the screws 30 from coming out of these bore holes.

It will be understood that this configuration does not limit the invention and that other retaining means can be used.

In the preferred embodiment of the invention, the fracture of the fusible screws 30 of the decoupling means 28 can be provided as a minimum and this, as soon as a single blade 13 is lost. This configuration does not limit the invention and the loss of a higher number of blades could be tolerated.

Conversely, if it is required that the fracture of the fusible screws 30 occurs only in case of fracture or loss of a blade 13, it is required that this fracture does not occur in case of a simple slowing down of the fan 12.

Thus, it is provided that the predetermined resistive torque $C_D$ be strictly greater than any torque that corresponds to a resistive torque exerted by the fan 12 on the speed reduction device 20, in case a bird is ingested without the loss of a blade by said fan 12. Such an event can indeed produce a tangential force that slows down the fan 12 but does not risk damaging the reduction device 20 or the shaft 18. In this case, the occurrence of an event such as the ingesting of a bird does not cause the fracture of the fusible screws 30.

The fracture is however provided for an event that corresponds to a predetermined percentage of the maximum torque to which the shaft 18 of the fan 12 is subjected. For example, it is possible to determine the fracture torque $C_D$ in order to respond to the loss of a blade, as was seen above. In the configuration of the turbine engine mentioned above, this torque $C_D$ is then located within a range from 120% to 200% of the maximum torque to which the shaft 18 of the fan 12 is subjected.

It is also possible to choose another fracture criterion of the screws 30, such as for example jamming or blocking of the speed reduction device 20. In this case, the torque $C_D$ is located in a range from 200% to 300% of the maximum torque $C_D$ to which the shaft 18 of the fan 12 is subjected.

The values of the decoupling torque $C_D$ mentioned above depend on the material of the fan. Its value will be different according to whether the fan comprises blades made of metal, or blades made of a composite material.

For the information purposes only, and in a non-limiting manner of the invention, it is possible to consider for example the case of a turbine engine that has a maximum thrust between 100 kN and 300 kN, with a fan 12 with a diameter between 2 and 3 m, and a speed reduction device having a reduction ratio between 2.5 and 5. In this case, the maximum torque at the output of the speed reduction device 20 is between 50,000 and 170,000 N.

In this configuration, in a non-limiting manner of the invention, the value of the decoupling torque determined in the three embodiments of the means 28 for decoupling can therefore vary substantially between 60,000 N·m and 510,000 N·m.

It will of course be understood that these values are only indications and depend on the architecture and the sizing of the turbine engine.

Advantageously, means for detecting the decoupling of the reduction device 20 and of the fan shaft 18 by the means for decoupling 28 can be provided in order to control at least a speed reduction of the turbine, even a complete stoppage of the turbine engine.

Thus it is possible to measure the speed of the output flange 50 of the speed reduction device 20. Detecting the runaway of this speed with respect to that of the fan 12 can thus be interpreted as a decoupling and trigger the activation of regulation members of the engine. It is then possible to limit the flow rate of fuel in order to cause the speed of the turbine to drop, and if a turbine comprising an axial brake is arranged between a rotor portion and a stator portion, to activate this brake in order to slow down and/or stop the turbine.

Figure 10:
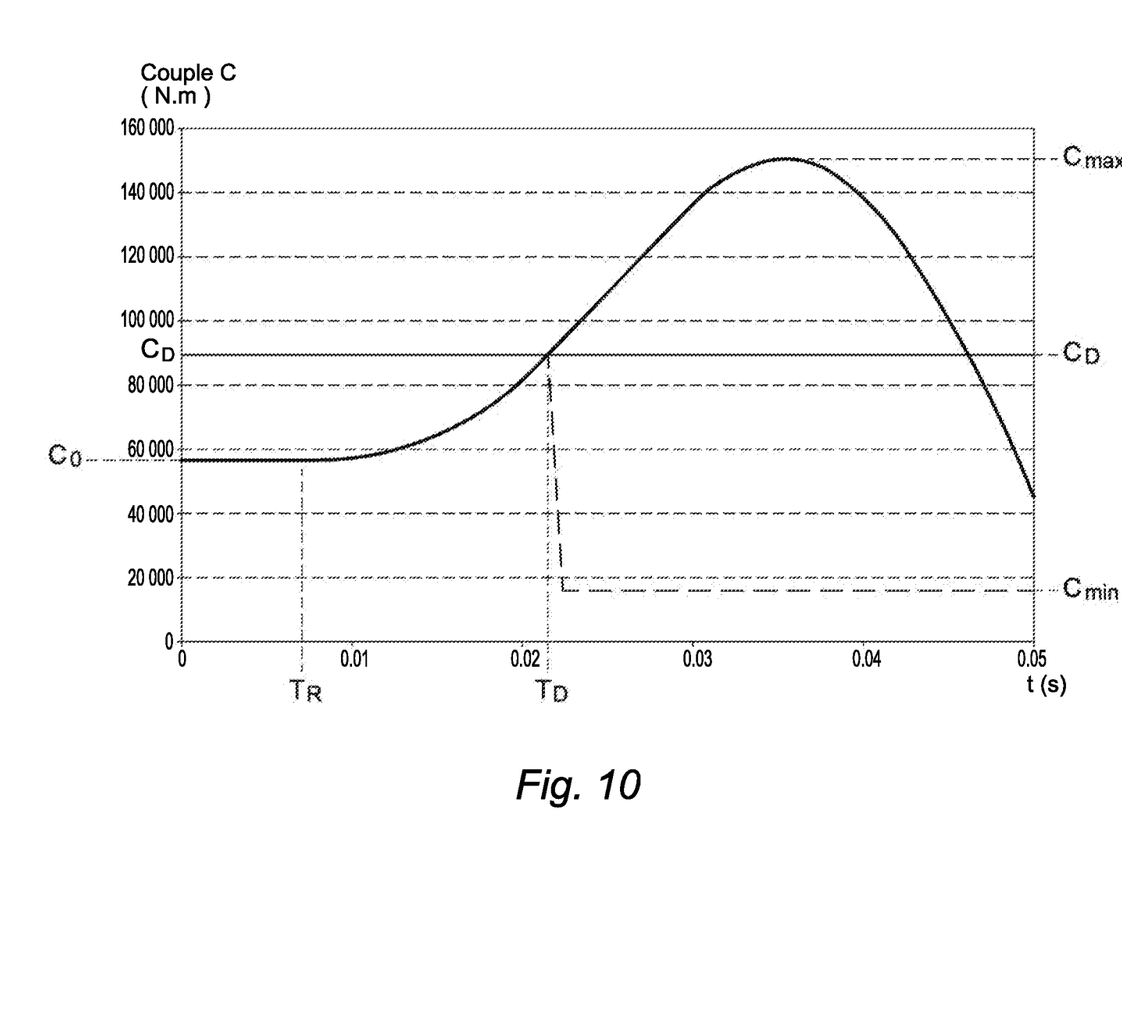
FIG. 10 is a diagram showing the resistive torque exerted by a fan shaft of the turbine engine on the speed reduction device as a function of time during the loss of a blade of the fan.

FIG. 10 shows comparatively the resistive torque "C" transmitted, on the y-axis, as a function of the time "t" on the x-axis, in case of a fracture of a fan blade 13.

As can be seen on the curve in thick lines, in a conventional turbine engine, from an optimum operating torque $C_0$, at an instant $T_R$ a fracture of a blade 13 can occur. This fracture leads to an increase in the resistive torque until a limit value $C_{max}$ that corresponds to the blocking of the reduction device 20 and of the fan 12, or more exactly to a risk of blocking according to the specifications of the reduction device, making the latter improper for the use thereof.

In the turbine engine according to the invention, the maximum torque is determined to a torque $C_D$ or decoupling torque. Therefore, during operations, at an instant $T_R$ a fracture can also occur of a blade 13, which leads to an increase in the resistive torque up to the value $C_D$ or decoupling torque value. The torque then decreases, according to the curve represented by a dotted line, until a value $C_{min}$, which corresponds to a state of free rotation of the fan 12.

It will of course be understood that these values are only indications and depend on the type of blade used, as well as the architecture and the sizing of the engine.

It will be understood that, when the decoupling occurs due to the loss of a blade, from the moment when the fan 12 is decoupled from the turbine shaft 16, the turbine 16 is no longer subjected to a resistive torque coming from said fan. There is therefore a risk of runaway of the turbine if the speed reduction device 20 is not decoupled, with this runaway driving the speed reduction device 20 at speeds for which it is not intended to operate.

Thus preferably, the turbine engine or turbine engine 10 comprises means for detecting the decoupling of the reduction device 20 and of the fan shaft 18 able to control at least a speed reduction of the turbine, even a complete stoppage of the turbine engine.

Thus it is known to measure the speed of the fan shaft 18 via a speed sensor. Detecting the runaway of the speed measured can thus be interpreted as a decoupling and trigger the activation of the regulating systems of the engine. It is then possible to limit the flow rate of fuel in order to cause the speed of the turbine to drop, or, if the turbine comprises an axial brake between a rotor portion and a stator portion, to activate this brake in order to slow down and/or stop the turbine.

The invention therefore provides a safe solution to the risks of overspeed of a drive line of the turbine engine, in particular in case of fracture of a fan blade of the turbine engine or of the blocking of said speed reduction device. The decoupling device not only allows to protect the connection between the fan and the speed reduction device, but also the internal elements of the speed reduction device, as well as the rotating elements placed upstream from the reduction gear according to the path of the engine power, namely the LP compressor shaft, the LP turbine shaft and the LP turbine.

The invention claimed is:

1. A turbine engine comprising a fan shaft driven by a turbine shaft by means of a rotational speed reduction device, said turbine engine comprising decoupling means interposed between the reduction device and the fan shaft, wherein the decoupling means decouples the reduction device and the fan shaft, and wherein the reduction device is coupled to the fan shaft by means of a curvic coupling between the reduction device and the fan shaft, said curvic coupling having trapezoidal teeth meshing with one another, said decoupling means comprises said curvic coupling wherein said decoupling means is configured to decouple the reduction device and the fan shaft in response to a resistive torque greater than or equal to a predetermined resistive torque, referred to as a decoupling torque, wherein the resistive torque acts between the fan shaft and the reduction device.

2. The turbine engine according to claim 1, wherein the trapezoidal teeth of the curvic coupling extend axially and the turbine engine comprises two toothed coupling plates, each coupling plate of the curvic coupling comprising the trapezoidal teeth meshing with one another, the two toothed coupling plates being fastened to one another by fusible axial screws forming the decoupling means.

3. The turbine engine according to claim 2, wherein the coupling plates each comprise two coaxial sets of trapezoidal teeth, and the fusible axial screws pass through bore holes formed in the coupling plates and arranged along an intermediate radius between the two coaxial sets of the trapezoidal teeth of each coupling plate.

4. The turbine engine according to claim 2, wherein the fusible axial screws each comprise a section of reduced diameter, forming tensile fracture initiation and the section is arranged between two main sections with a diameter greater than said section of reduced diameter.

5. The turbine engine according to claim 4, wherein tilt angles ($\alpha$) of inclined planes of the trapezoidal teeth, a number of the fusible axial screws, diameters of the reduced diameter section and main sections of the number of fusible axial screws, and a tightening torque of said number of fusible axial screws are configured to allow for a fracture of said number of fusible axial screws when the resistive torque exerted between the plates of the coupling exceeds the decoupling torque.

6. The turbine engine according to claim 2, wherein the reduction device is an epicyclic gear, and a planetary gear is rotationally driven by the turbine shaft of the turbine engine, and at least one planetary carrier of said reduction device rotationally drives one of the coupling plates with the trapezoidal teeth of the curvic coupling, and wherein at least one crown of said reduction device, which is fastened to a casing of the turbine engine by an axially deformable support, allows for an axial retraction of said reduction device when the plates of the coupling are separated following the fracture of the fusible axial screws, and the at least one crown accompanies the retraction of said at least one planetary carrier on said planetary gear.

7. The turbine engine according to claim 6, wherein the at least one planetary carrier of said reduction device comprises bore holes that are arranged facing bore holes of said one of the coupling plates, said bore holes of the at least one planetary carrier passing through said at least one planetary carrier and being configured to receive threaded ends of the fusible axial screws and lock nuts of the fusible axial screws.

8. The turbine engine according to claim 2, comprising means for retaining the fusible axial screws.

9. The turbine engine according to claim 2, wherein the fusible axial screws are fractured when the curvic coupling is subjected to the resistive torque exerted between the fan shaft and the reduction device in an event of a loss of at least one blade of the fan driven by said fan shaft.

10. The turbine engine according to claim 2, wherein the fusible axial screws are fractured when the curvic coupling is subjected to the resistive torque exerted between the reduction device and the fan shaft in an event of blocking of said reduction device.

* * * * *